United States Patent [19]

Choshitani et al.

[11] Patent Number: 5,180,958
[45] Date of Patent: Jan. 19, 1993

[54] ACTIVE CONTROL PRECISION DAMPING TABLE

[75] Inventors: Hitoshi Choshitani, Ibaraki; Takahide Osaka, Itami; Fumiaki Itojima, Yao; Masashi Yasuda, Suita, all of Japan

[73] Assignee: Tokkyo Kiki Kabushiki Kaisha, Hyogo, Japan

[21] Appl. No.: 680,173

[22] Filed: Apr. 3, 1991

Related U.S. Application Data

[62] Division of Ser. No. 299,586, Jan. 23, 1989, Pat. No. 5,060,519.

[30] Foreign Application Priority Data

| Feb. 18, 1988 | [JP] | Japan | 63-35829 |
| Feb. 18, 1988 | [JP] | Japan | 63-35830 |
| Feb. 18, 1988 | [JP] | Japan | 63-35831 |

[51] Int. Cl.⁵ .................................. G05B 5/01
[52] U.S. Cl. ........................ 318/623; 318/600; 318/448; 248/550
[58] Field of Search .......... 318/560, 568.16, 623, 318/629, 642, 646, 649, 651, 587, 569, 600, 448; 73/662, 663, 664, 665, 666; 188/266, 269; 248/550

[56] References Cited

U.S. PATENT DOCUMENTS

| 4,181,029 | 1/1980 | Talbott, Jr. | 73/665 |
| 4,340,777 | 7/1982 | DeCosta et al. | 178/18 |
| 4,483,425 | 11/1984 | Newman | 188/378 |
| 4,633,982 | 1/1987 | Swigert | 188/267 |
| 4,872,190 | 10/1989 | Stojkov et al. | 318/620 X |

Primary Examiner—Bentsu Ro
Attorney, Agent, or Firm—Edwin E. Greigg; Ronald E. Greigg

[57] ABSTRACT

An active control precision damping table supported by air springs. Level displacement and vibrations of the table are detected by a sensor or sensors, and sensor outputs are fed to a variation adder which carries out an adding operation on one of the sensor outputs and an inversion signal produced by inverting the other sensor output 180 degrees. The adder outputs results of the operation to a drive circuit, which in turn outputs a drive signal to a control valve. The control valve is operable in response to the drive signal to adjust air pressure in pressure vessels of the air springs.

3 Claims, 7 Drawing Sheets

ACTIVE CONTROL PRECISION DAMPING TABLE

CROSS REFERENCE TO RELATED APPLICATION

The present application is a division of copending U.S. patent application Ser. No. 07/299,586 filed Jan. 23, 1989, now U.S. Pat. No. 5,060,519.

BACKGROUND OF THE INVENTION (1) Field of the Invention

The present invention relates to (1) a displacement detecting circuit for controlling the posture of a running vehicle or for immediately and accurately detecting displacement in the level of a precision surface plate which supports a holography set, an electron microscope, a semiconductor manufacturing device or any other precision measuring device, (2) a novel control circuit with the above detecting circuit incorporated into a variation control circuit which maintains or improves the precision of devices by preventing or suppressing microvibrations transmitted from the floor, (3) a variation control circuit including the above control circuit and having a displacement detecting function, and (4) an active control precision damping table including the above circuit, which table supports a holography set, an electron microscope, a semiconductor manufacturing device or other precision measuring device.

(2) Description of the Prior Art (1) A known example of a displacement detecting circuit utilizing an encoder will be described. In this example, the encoder has a reference scale attached to a reference surface and a movable scale attached to a movable side. The encoder outputs a pulse signal corresponding to an amount of movement of the movable scale from zero point on the reference scale. The amount of movement is detected through a count of the number of pulses. The precision and resolution in detecting the amount of movement are limited since they are dependent on the mechanical precision and mechanical construction of the pulse motor. To improve the detecting precision, the encoder per se must be increased in size. There has also been the problem of detection of movement being limited by the encoder capacity.

(2) A known variation control circuit simply detects a disturbance transmitted from the floor to a measured object, and outputs a signal corresponding to the disturbance to a drive circuit for controlling the disturbance. There has been no measure taken to deal with level variations due to load displacement or a shift in the center of gravity on the vehicle or the surface plate.

(3) Controls of the displacement and shift require a level sensor and a variation sensor, which would complicate the circuit construction.

Figure 11:
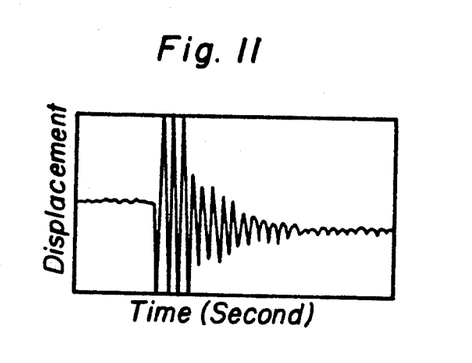
FIG. 11 is a graph showing a damping effect produced by known air springs when an impact load is applied.

(4) Known damping tables have all relied simply on a damping system employing support by air springs. This system produces a conspicuous damping effect in a high frequency region but allows resonance in a low frequency region. When an impact occurs, it is not immediately absorbed but produces a very large amplitude as shown in FIG. 11. There is a problem of slow damping speed with the shock gradually attenuating thereafter to a certain level. There have been proposals to effect active control by means of a control valve or the like, but these proposals are hardly practicable since they fail to deal with level variations due to load variation or shift.

SUMMARY OF THE INVENTION

The present invention has been made having regard to the disadvantages of the prior art. An object of the present invention is to provide a displacement detecting circuit capable of electrically counting all displacements of an object to realize a high degree of detecting precision and resolution by use of a small apparatus. Furthermore there is provided a variation control circuit which utilizes the above circuit to control disturbances and to deal with load variations and shifts in the center of gravity.

Another object of the present invention is to provide a variation control circuit having a displacement detecting function, which is capable of electrically counting all displacements of an object to realize a high degree of detecting precision and resolution to be very compact. Such a circuit is capable of controlling disturbances in addition to detecting displacements by means of a single sensor, and a small simple circuit structure.

Still another object of the invention is to provide an active control precision damping table including the above circuit, which, although utilizing known air springs, is capable of precise level control and vibration damping control in a manner basically different from the prior art.

In order to achieve the objects, a displacement detecting circuit according to the present invention comprises a displacement sensing section for detecting displacement of a device and outputting a displacement signal voltage, a displacement pulse generator for generating constant pulses in accordance with an internal clock while the displacement signal voltage is output, and an adder for adding the pulses thereby to indicate the displacement as a digital value.

In the above construction, the displacement sensing section first detects displacement such as the level of a vehicle, device or other measured object, and outputs an analog displacement signal voltage corresponding to the displacement. This analog displacement signal voltage is input to the displacement pulse generator. The pulse generator generates constant pulses in accordance with an internal clock while the displacement signal voltage is output. These pulses are input to the adder which counts the pulses and outputs a displacement signal. This forms a basis for determining the displacement as a digital value.

Thus, in the displacement detecting circuit according to the present invention, the displacement detecting precision and resolution are electrically determined as distinct from the known encoder system. This detecting circuit is highly responsive as well as assuring high precision. There occurs no scale overage regardless of the amount of displacement, and there is a further advantage of compactness in capacity. Scale overage is a term used when an instrument is moved beyond a point at which a displacement cannot any longer be detected.

In order to achieve a portion of the objects, a variation control circuit utilizing the above displacement detecting circuit according to the present invention comprises a vibration detecting circuit for detecting vibrations of a measured object due to a vibration source such as a floor, a machine or the like, an arithmetic circuit for outputting a variation detection signal in response to a variation signal received from the vibration detecting circuit, a phase inverter for inverting phase of the variation detecting signal 180 degrees, a level variation adder for adding an inversion signal output from the phase inverter and a level variation signal output from the adder of the displacement detecting circuit, and a drive circuit for generating a drive signal in response to an added variation signal received from the level variation adder.

In the above construction, the vibration detecting circuit detects vibrations of a measured object due to a vibration source such as a floor or a device. In response to a variation signal received from the vibration detecting circuit, the arithmetic circuit outputs an analog variation detection signal. The phase of this detection signal is inverted 180 degrees by the phase inverter. The level variation adder adds an inversion signal output from the phase inverter and the level displacement signal output from the adder of the displacement detecting circuit noted hereinbefore, to effect level compensation as well as disturbance control. An added variation signal as compensated is input to the drive circuit which outputs a level-compensated disturbance control drive signal to a drive mechanism.

Thus, in the variation control circuit according to the present invention, the phase inverter allows not only the vibrations from the vibration source to be offset but the return in level to be made promptly. This control circuit is very well suited for practical use.

In order to achieve other objects, a variation control circuit having a displacement detecting function according to the present invention comprises a displacement detecting circuit including a sensor for detecting level displacement of a device and vibrations of the device due to a vibration source and outputting a displacement or variation signal voltage, a comparator for comparing the displacement signal voltage with a reference voltage and outputting a displacement signal voltage when the displacement signal voltage deviates from the reference voltage, a displacement pulse generator for generating constant pulses in accordance with an internal clock while the displacement signal voltage is output, and an adder for adding the pulses thereby to indicate the displacement as a digital value; an arithmetic circuit for outputting a variation detection signal in response to a variation signal received from the sensor as divided; a phase inverter for inverting the phase of the variation detection signal 180 degrees; a level variation adder for adding an inversion signal output from the phase inverter and a level variation signal output from the adder of the displacement detecting circuit; and a drive circuit for generating a drive signal in response to an added variation signal received from the level variation adder.

The circuit for achieving an object includes two sensors, namely the level sensor and vibration sensor, whereas the circuit for achieving the another object includes a single sensor acting as both the level sensor and vibration sensor.

On the other hand, the displacement detecting circuit is the same in both constructions. Level displacement of a device detected by the sensor is output as a displacement signal after the pulses are counted by the adder as described hereinbefore, whereby the displacement is grasped as a digital value.

This sensor also detects vibrations from the floor, device or other vibration source. The resulting amount of variation is divided as a variation signal for an input to the arithmetic circuit. In response to the variation signal, the arithmetic circuit outputs an analog variation detection signal. The subsequent process is the same as in the circuit for achieving the first object, to effect disturbance control and level compensation.

The level displacement and the variation due to the vibration source as detected by the sensor may be divided for input to the comparator and the arithmetic circuit and output therefrom simultaneously to be added by the level variation adder as noted above. However, a controller may be provided to actuate the comparator for level compensation and thereafter to actuate the arithmetic circuit for disturbance control.

Thus, the variation control circuit has an advantage, in addition to the advantage of the control circuit, of requiring a single sensor to effect level adjustment and disturbance vibration damping. This feature allows the circuit construction to be very simple.

An embodiment of an active control precision damper table according to the present invention comprises a table body supported by air springs having pressure vessels. On the table body, there are provided a level sensor and a vibration sensor. A level displacement signal is detected by the level sensor and an inversion signal is obtained by converting a vibration detecting signal resulting from vibrations of the table body caused by a vibration source such as a floor 180 degrees. The level displacement signal and the inversion signal are applied to a level variation adder where these signals are added together. A drive circuit generates a drive signal and controls opening and closing of a control valve which adjusts air pressure in the pressure vessels of the air springs.

An embodiment of an active control precision damper table according to the present invention comprises a table body supported by air springs having pressure vessels. On the table body there are included a sensor, a level variation adder for carrying out an adding and subtracting operation on an inversion signal produced by inverting a vibration detection signal output from the sensor 180 degrees resulting from vibrations of the table body due to a vibration source such as a floor, a device or the like. A drive circuit generates a drive signal in response to an added variation signal received from the level variation adder, and controls opening and closing of a control valve operable in response to the drive signal to adjust air pressure in the pressure vessels of the air springs.

In the first type of active control precision damper table, when a load such as a device is placed on the table body, the latter moves downward by an amount corresponding to the load. Then the level sensor immediately detects the level displacement $\delta$, and outputs a level displacement signal corresponding to the displacement. This level displacement signal is processed and input to the level variation adder. At the same time, the vibration sensor detects vibrations of the table body due to a vibration source such as the floor or any other device. The resulting detection signal is inverted 180 degrees into an inversion signal for input to the level variation adder. The level variation adder carries out an adding operation on the inversion signal and the level displacement signal, and outputs and added variation signal with level compensation as well as disturbance control. The added variation signal as compensated is input to the drive circuit. The drive circuit outputs a level-compensated disturbance control drive signal for precision control of an opening and closing degree of the control valve.

These processes are the same as in the variation control circuit that achieves the second half of the first object of the invention. Therefore, the phase inverter immediately cancels out the vibrations from the vibration source, to produce a very precise and rapid vibration damping effect and to effect level compensation for a prompt return to the original level at the same time. This active control precision damper table is quite novel and finds no parallel in the prior art.

The second type of active control precision damper table employs the circuit that achieves the second object of the invention. As distinct from the first type of damper table, the second type damper table includes a single sensor in replacement for the level sensor and vibration sensor. The function and effect are the same as in the circuit achieving the second object.

Other advantages of the present invention will be apparent from the following description.

DETAILED DESCRIPTION OF THE EMBODIMENTS

The present invention will be described hereinafter first as embodied into a displacement detecting circuit A, next a variation control circuit B1 which achieves the first object of the present invention, then a variation control circuit B2 which achieves the second object of the invention, and finally two types of damping table C1 and C2 utilizing these control circuits.

A. One Example of Displacement Detecting Circuit A

Figure 1:
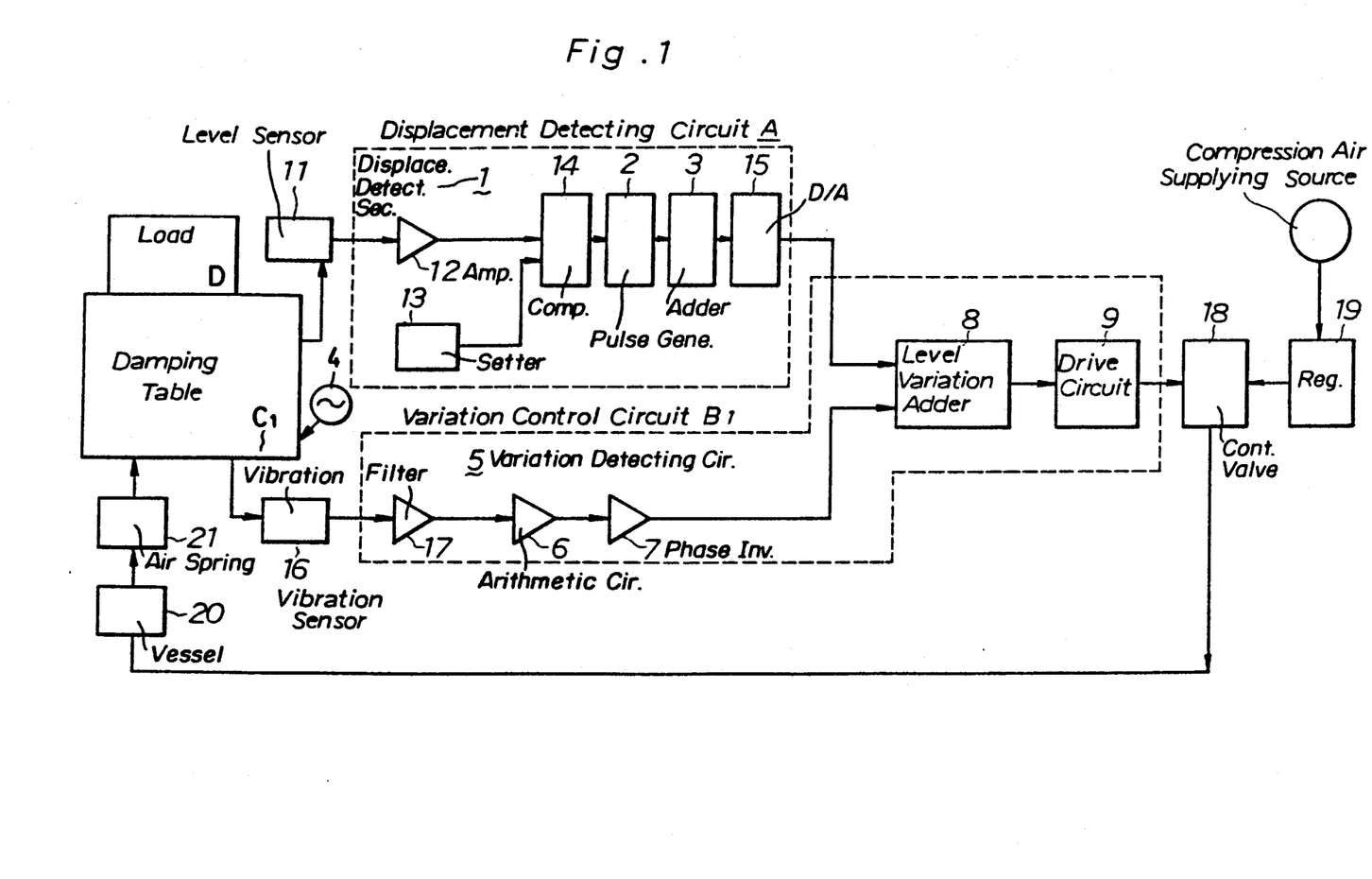
FIG. 1 is a diagram of a circuit constructed to achieve the first object of the present invention.
Figure 2:
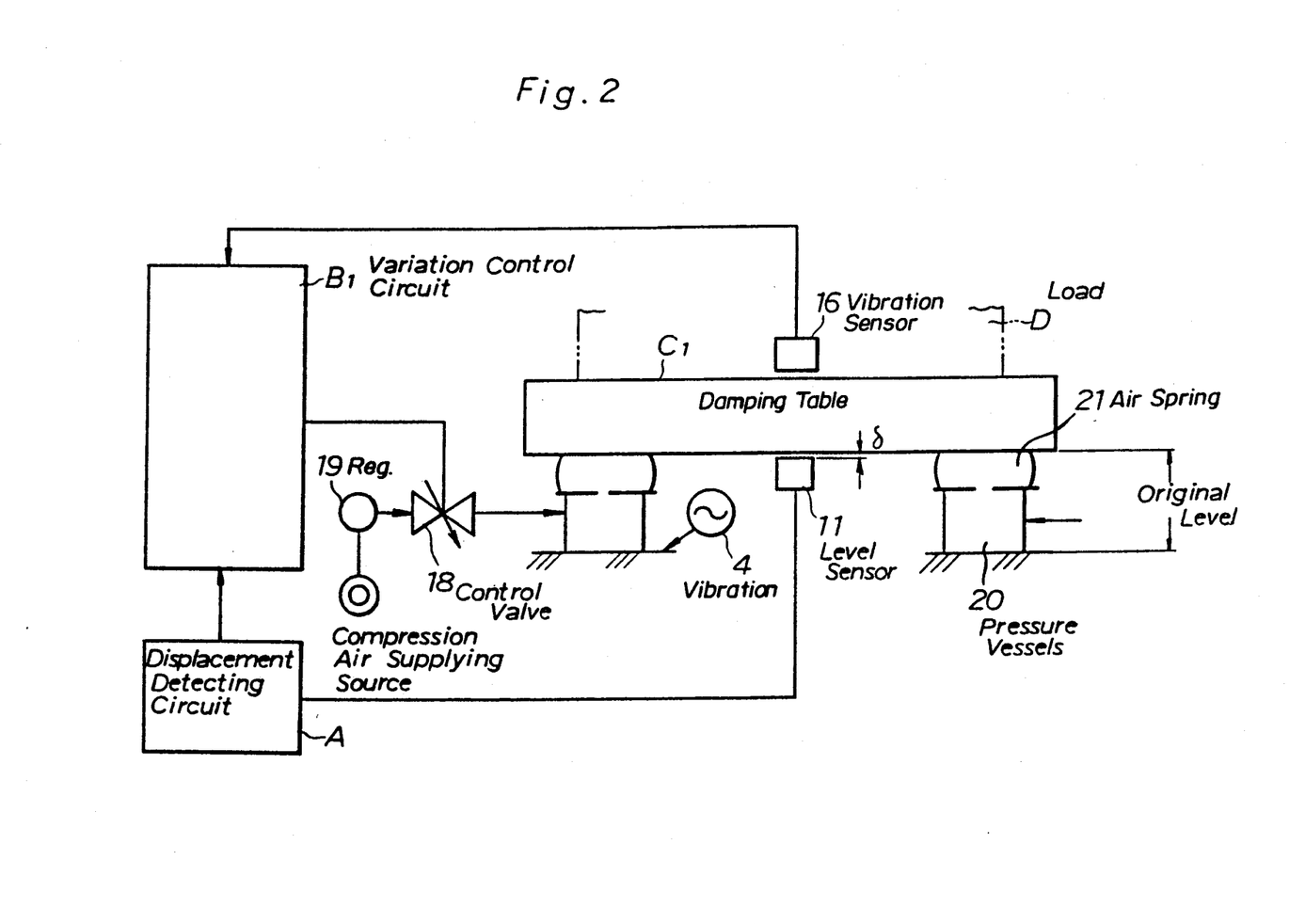
FIG. 2 is a diagram of a precision surface plate employing the circuit shown in FIG. 1.

The displacement detecting circuit A shown in FIGS. 1 and 2 comprises a displacement sensing section 1, a displacement pulse generator 2 and a displacement detection adder 3. The sensing section 1 includes a displacement amplifier 12 a reference voltage setter 13 and a comparator 14. the displacement amplifier 12 is connected to receive a signal from a sensor such as a level sensor 11 for detecting displacement of a measured object from a reference position. The level sensor 11 detects a downward movement of, for example, a damping table C under a load D, and generates a detection signal voltage corresponding to the downward movement. Here the amount of displacement is represented by $\delta$ as shown in FIG. 2. The detection signal voltage is transmitted through the displacement amplifier 12 to be input in increased amplitude to the comparator 14. This comparator 14 is connected also to the reference voltage setter 13, and the amplified detection signal voltage is compared with a reference voltage. When the detection signal voltage is higher or lower than the reference voltage, the comparator 14 outputs a displacement signal voltage to the displacement pulse generator 2. The displacement pulse generator 2 continues to generate a constant pulse signal in accordance with an internal clock during receipt of the displacement signal voltage. The displacement pulse signal is input to the adder 3 where the pulses are added sequentially, so that the displacement is detected as a digital value. The displacement is output as a stepwise digital signal to a D/A converter 15 connected to the adder 3. The D/A converter 15 converts the digital signal into a smooth displacement analog signal, and applies the analog signal to a level variation adder 8 of a variation control circuit $B_1$ which is not a part of the displacement detecting circuit A.

The above circuit construction is capable of coping with a great displacement exceeding the capacity of level sensor 11. More particularly, the number of pulses is counted as long as the displacement detection voltage differs from the reference voltage, the counting of pulses being stopped only when a movable element returns to a home position and its displacement becomes zero. Thus a return to zero point is made accurately even in the event of overscaling of the level sensor 11.

B. One Example of Variation Control Circuit $B_1$

The variation control circuit $B_1$ as shown in FIGS. 1 and 2 comprises a vibration detecting circuit 5, an arithmetic circuit 6, a phase inverter 7, a level variation adder 8 and a drive circuit 9. The vibration detecting circuit 5 includes a lowpass filter 17. The lowpass filter 17 is connected to a vibration sensor 16 on damping table $C_1$. The vibration sensor is not a part of the vibration detecting circuit 5.

Vibrations transmitted from a vibration source 4 such as the floor, a machine or the like to a measured object are detected and output as a vibration signal voltage by the vibration sensor 16. At this stage, high frequency components are superposed on the vibration signal voltage. The high frequency components are filtered by the lowpass filter 17 as necessary, and relatively smooth low frequency components only are output as the vibration signal voltage. It is, of course, unnecessary to filter the high frequency components if a control mechanism described later is fully capable of coping with the high frequency components. The vibration signal voltage having been filtered is input as a vibration signal to the arithmetic circuit 6, and is output therefrom as a variation detection signal. This variation detection signal is input to the phase inverter 7, from which an inversion signal emerges with the phase inverted 180 degrees for an input to the level variation adder 8.

The level variation adder 8 receives the inversion signal output from the phase inverter 7 and the level displacement signal output from the adder 3 through D/A connector 15. The displacement detecting circuit A, carries out an adding operation on the two signals, and outputs a resulting signal to a drive section. In response to the added variation signal received from the level variation adder 8, the drive section outputs a drive signal for causing the control mechanism to effect posture control and vibration damping.

The above circuit construction as incorporated into the damping table $C_1$ will be described in detail later.

Figure 3:
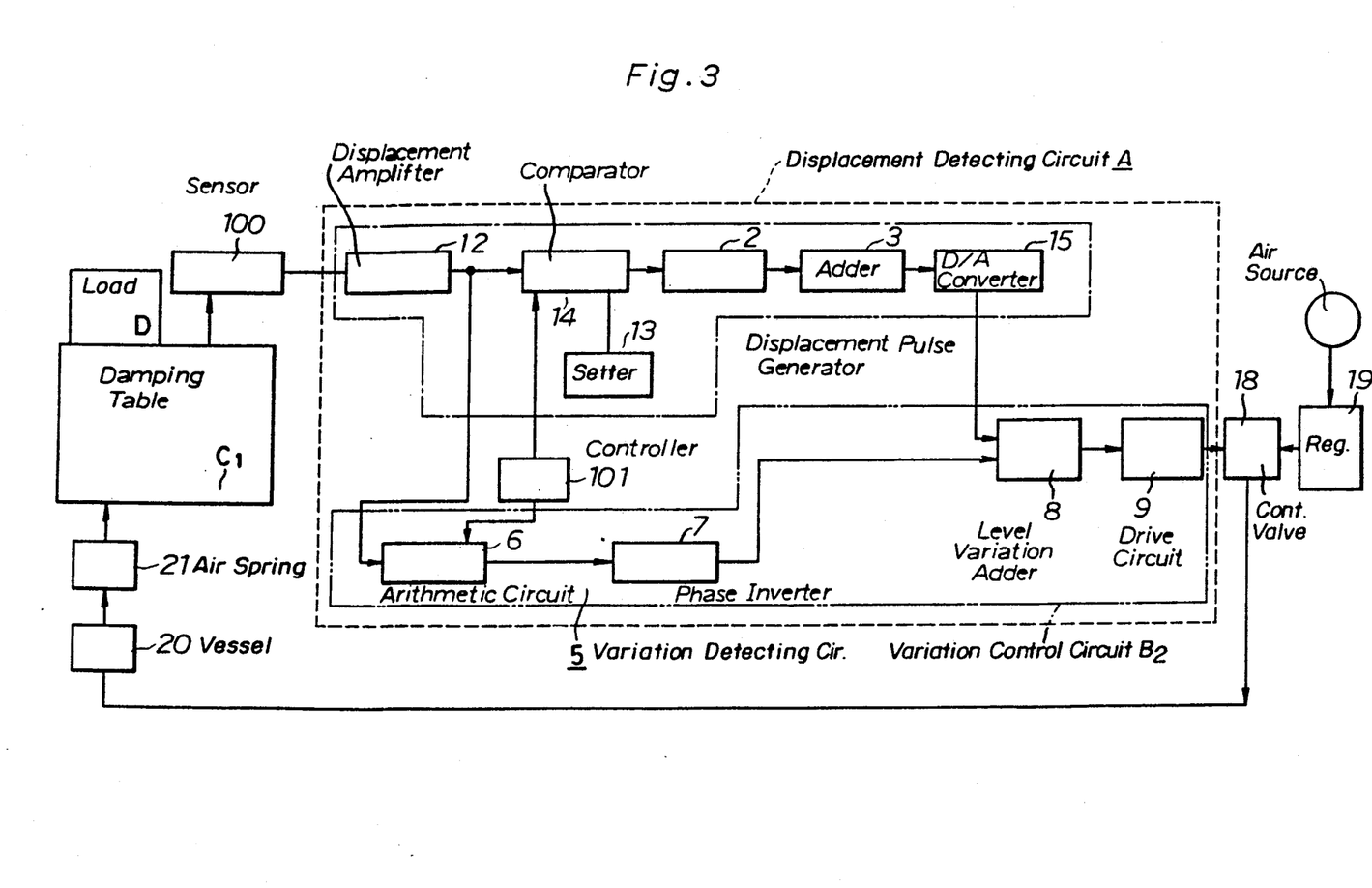
FIG. 3 is a diagram of a circuit constructed to achieve the second object of the invention.
Figure 4:
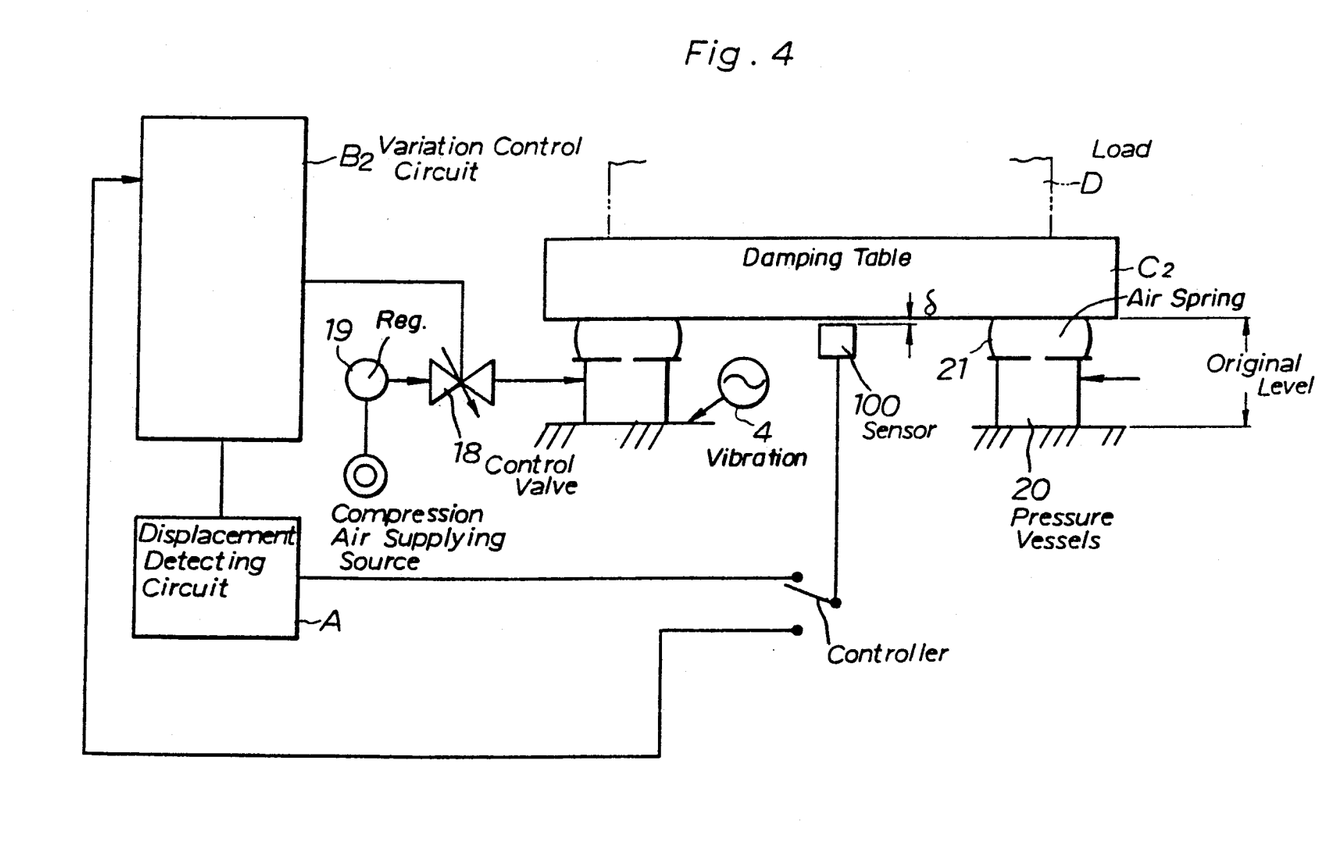
FIG. 4 is a diagram of a precision surface plate employing the circuit shown in FIG. 3.
Figure 5:
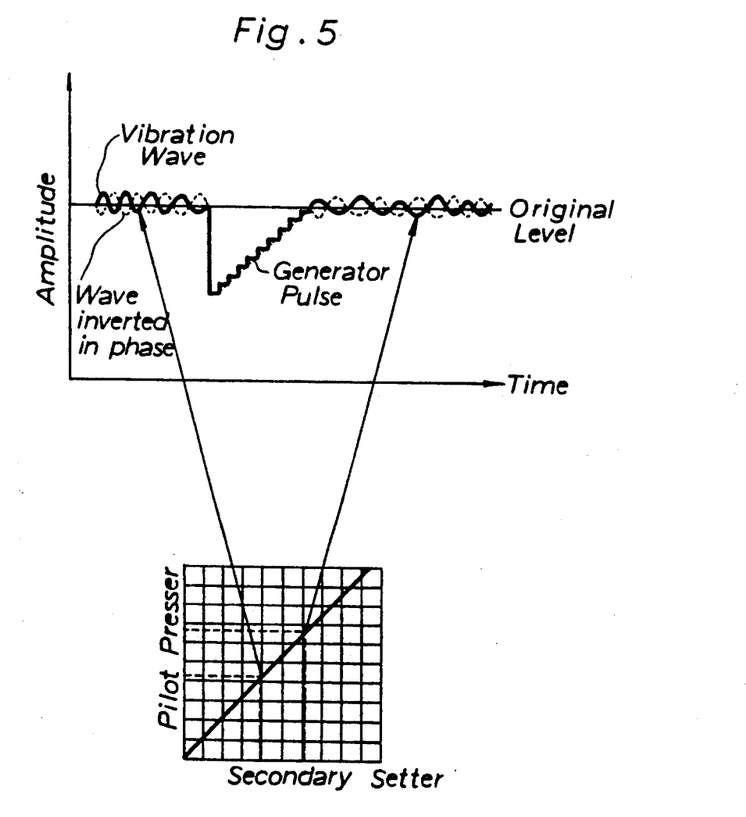
FIG. 5 is a view illustrating a relationship between variations in the current flowing through a control valve of the present invention and a waveform occurring at control times.

Next, a variation control circuit $B_2$, as shown in FIGS. 3 and 4 for achieving the second object of the invention will be described. The same components as in the variation control circuit $B_1$ achieving the first object will not be described and only different components will be described.

The displacement detecting circuit A is the same as in the variation control circuit $B_1$ as already described.

The difference lies in that a single sensor 100 is provided in place of the level sensor 11 and the vibration sensor 16. The sensor 100 detects disturbances from the floor, vibrations from a load D placed on the damping table $C_2$, and level displacements due to these disturbances or vibrations. Resulting signals output from the sensor 100 are amplified by the displacement amplifier 12, and are then divided for input to the comparator 14 of the displacement detecting circuit A and to the arithmetic circuit 6 of the variation control circuit $B_2$, respectively. A controller 101 may be provided to selectively actuate the comparator 14 and the arithmetic circuit 6. In this case the controller 101 is operable to actuate the comparator 14 for inputting the signal for level compensation to the level variation adder 8 as described hereinbefore. Upon completion of this step, the controller 101 is switched to actuate the arithmetic circuit 6 for performing a vibration damping function. The comparator 14 and the arithmetic circuit 6 may, of course, be actuated simultaneously without using controller 101, the outputs of the comparator 14 and arithmetic circuit 6 being simultaneously input to the level variation adder 8 to carry out the level compensation and vibration damping at the same time.

The level compensation process and damping process will not be described since they are the same as in the circuit achieving the first object.

Active precision damping tables $C_1$ and $C_2$ employing the above two circuits will be described next.

First, the damping table $C_1$ which employs the circuit realizing the first object will be described with reference to FIGS. 1 and 2, but the description of the circuit per se will not be repeated.

Figure 7:
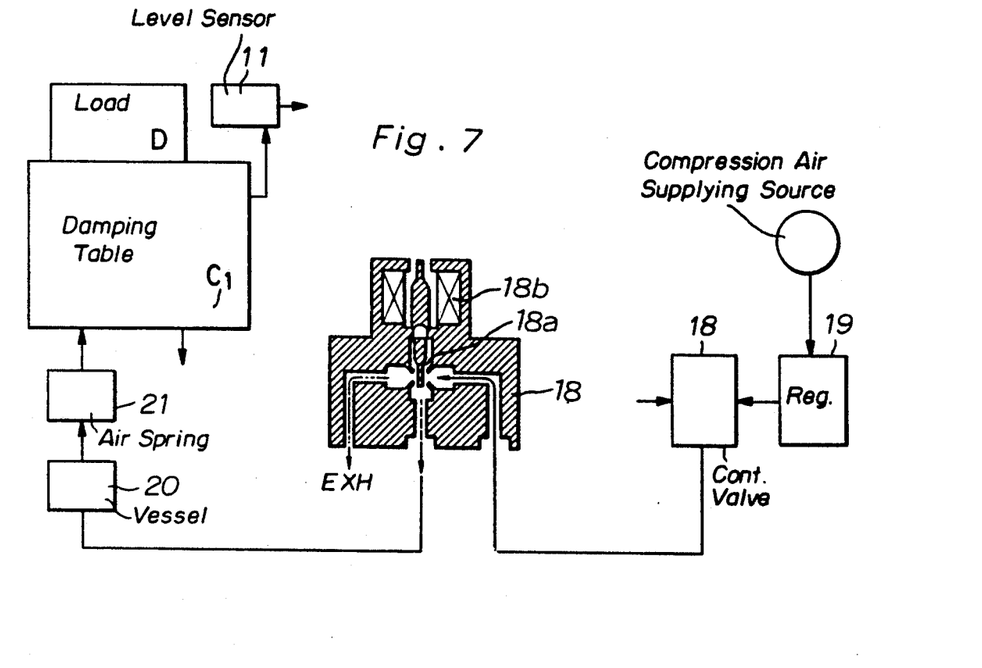
FIG. 7 is a schematic sectional view of the control valve employed for the damping table.

The drive circuit 9 receives the level compensation signal and control signal output from the level variation adder 8 of the variation control circuit $B_1$. In response to the added variation signal, the drive circuit 9 outputs a drive signal to effect precision control of an opening and closing degree of a control valve 18 comprising a servo valve or a proportional control valve. In this case the control valve 18 comprises a servo valve. As shown in FIG. 7, a vibration plate 18a is controlled by an electromagnetic coil 18b to precisely control air pressure in pressure vessels 20 of air springs 21. The damping table C1 is supported by the air springs 21 including the pressure vessels 20, and pressure control of the air springs 21 is effected by the control valve 18 as noted above.

When a load D shown in phantom is applied to the precision damping table $C_1$, the damping table C1 moves downwardly by an amount corresponding to the load D. The downward movement is immediately detected by the level sensor 11, which is input to the drive circuit 9 through the described route. As a result, the control valve 18 is actuated to supply compressed air to the pressure vessels 20 thereby to expand the air springs 21. This drives the damping table $C_1$ back to a home position. When the damping table $C_1$ completely returns to the home position, the displacement becomes zero whereby the level sensor 11 stops generating the displacement signal voltage. Since the number of pulses produced by the load D is counted by the adder 3 at this time, an energizing current corresponding to the load D continues to flow from the drive circuit 9 to the control valve 18 (that is, an energizing voltage is applied to the control valve 18). Consequently, the compressed air is continuously supplied to the pressure vessels 20 in an amount to keep lifting the load D to the home position.

When the damping table $C_1$ is lifted beyond the home position, the level sensor 11 generates the displacement signal voltage as above. Then the damping table $C_1$ is lowered to the home position.

Figure 8:
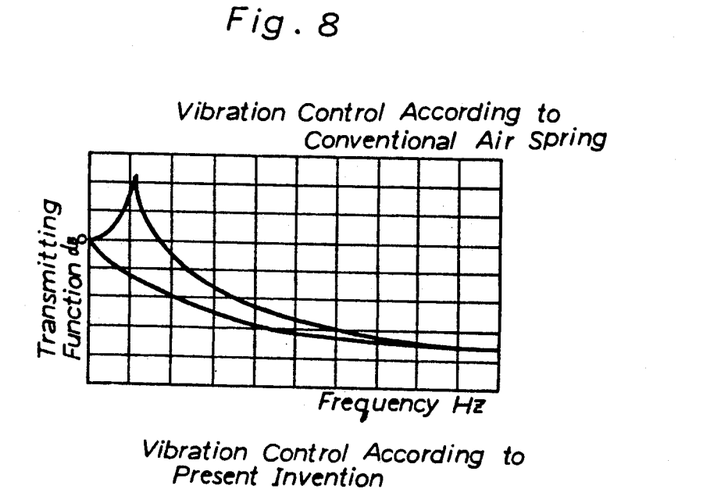
FIG. 8 is a graph for comparing damping effects of the damping table of the present invention and a known damping table supported by air springs.
Figure 9:
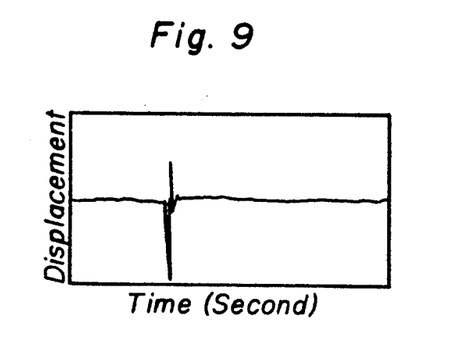
FIG. 9 is a graph showing a standstill state of the damping table vibration-damped according to the present invention when a shock is applied thereto.
Figure 10:
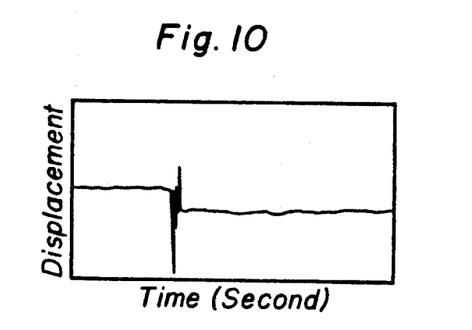
FIG. 10 is a graph showing a damping effect produced against a shock by a known active damping system having no level compensating function.

In the variation control circuit $B_1$, on the other hand, the phase inverter 7 outputs the inversion signal with the phase inverted 180 degrees. Therefore, not only low frequency vibrations generated from the vibration source 4 are canceled out to prevent resonance but shocks, if any, are rapidly damped. As a result, the damping table $C_1$ is stopped substantially upon arrival at the original level. This state is illustrated in FIG. 9. FIG. 10 shows a comparative example in which active control is effected without the level compensating function. FIG. 11 shows the prior art vibration damping by means of air springs. FIG. 8 shows the difference between the present invention and the prior art in vibration damping by means of air springs.

The embodiment shown in FIG. 4 is slightly different from the embodiment of FIG. 2, and employs the circuit achieving the second object of the invention. In this embodiment, the level sensor 11 and vibration sensor 5 are integrated into the sensor 100, and the lowpass filter 17 is omitted. The output of sensor 100 is divided for input to the arithmetic circuit 6. The subsequent process is the same as in the foregoing damping table $C_1$.

Figure 6:
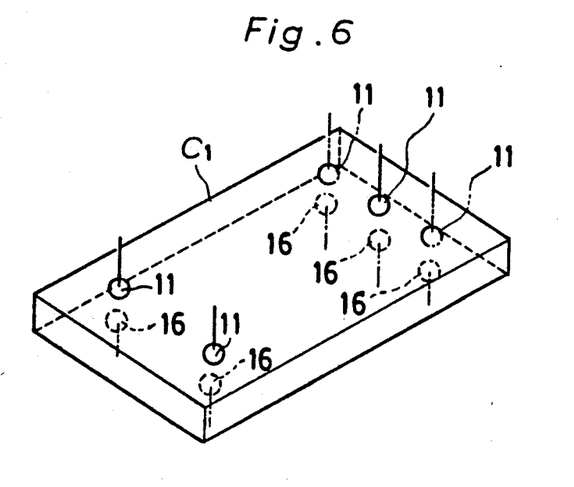
FIG. 6 is a schematic perspective view showing how sensors are arranged on a damping table.

Referring to FIG. 6, where both the level sensor 11 and vibration sensor 5 are used, these sensors are provided at a total of six to eight positions over the entire damping table $C_1$ with the level sensor 11 provided at three or four positions opposed to the legs, and the vibration sensor 5 also at three or four positions. Where the sensor 100 is used, it is provided at three or four positions of the damping table $C_1$.

The vibration sensors 5 may be provided not only on a top surface but on side faces of the damping table $C_1$. The reference character 19 in FIGS. 1 and 3 denotes a regulator which regulates the compressed air supplied by a compressor to the control valve.

What is claimed is:

1. A variation control circuit for generating a variation signal in response to displacement of an object, said variation control circuit comprising a displacement detecting circuit and a vibration detecting circuit; said displacement detecting circuit comprising a displacement sensing section for detecting displacement of a device and outputting a displacement signal voltage, a displacement pulse generator for generating constant pulses in accordance with an internal clock while the displacement signal voltage is output, and an adder for adding the pulses thereby to grasp the displacement as a digital value; said vibration detecting circuit outputting a vibration detection signal resulting from vibrations of said object in which the vibration detection signal is inverted by 180 degrees; said variation control circuit also comprising a variation adder for adding said inverted vibration detection signal and said digital value to produce said variation signal.

2. A variation control circuit utilizing a displacement detecting circuit which includes a displacement sensing section for detecting displacement of a measured object and outputting a displacement signal, said variation control circuit also comprising a vibration detecting circuit for detecting vibrations of the measured object due to a vibration source, an arithmetic circuit for outputting a variation detection signal in response to a variation signal received from the vibration detecting circuit, a phase inverter for inverting phase of the variation detection signal 180 degrees, a level variation adder for adding an inversion signal output from the phase inverter and said displacement signal, and a drive circuit for generating a drive signal in response to an added variation signal received from the level variation adder.

3. A variation control circuit comprising: a sensor for detecting displacement of an object, said sensor outputting a displacement signal and a vibration signal resulting from vibrations of the object; a phase inverter for inverting phase of the vibration signal 180 degrees; an adder for carrying out an adding operation on said displacement signal and said inverted vibration signal and outputting a variation signal; and a drive circuit for generating a drive signal in response to the variation signal received from the adder.

* * * * *